United States Patent [11] 3,615,419

[72] Inventor Stanley Field
 Piscataway, N.J.
[21] Appl. No. 736,591
[22] Filed June 13, 1968
[45] Patented Oct. 26, 1971
[73] Assignee National Starch and Chemical Corporation
 New York, N.Y.

[54] PHOTOCONDUCTIVE COATING SYSTEMS
 7 Claims, No Drawings
[52] U.S. Cl. ................................................. 96/1.8,
 96/1.7, 260/874, 260/901
[51] Int. Cl. ............................................... G03g 5/08
[50] Field of Search ............................................ 96/1.5–1.8;
 260/78.5, 874, 901, 41 B; 252/501

[56] References Cited
UNITED STATES PATENTS
2,979,402   4/1961   Greig .......................... 96/1.8
2,980,534   4/1961   Printz et al. ................. 260/901 X
3,345,162   10/1967  McFarlane et al. ......... 96/1.8
3,347,670   10/1967  Nelsen et al. ............... 96/1.5
3,404,979   10/1968  Bonjour ....................... 96/1.8
3,437,481   4/1969   Graver et al. ................ 96/1.8
3,121,006   2/1964   Middleton et al. ........... 96/1.5
3,245,786   4/1966   Cassiers et al. .............. 96/1.8
3,390,987   7/1968   Tomarek ..................... 96/1.5
3,519,421   7/1970   Cheng ........................ 96/1.8

Primary Examiner—Charles E. Van Horn
Attorney—James and Franklin

ABSTRACT: A photoconductive coating for application to a solid substrate which is to be utilized in electrophotographic operations, said coating comprising a layer of zinc oxide pigment bonded with a blend of a vinyl acetate polymer and a styrene-maleic anhydride copolymer.

PHOTOCONDUCTIVE COATING SYSTEMS

In the known electrophotographic processes, a solid substrate which has been coated with a photoconductive surface is electrostatically charged in the absence of light. The charged surface is then exposed to a light source, such as actinic-radiation reflected from a printed surface or transmitted through a transparency, which serves to discharge the exposed area while having no effect upon the charge on the unexposed areas which is thus retained in the form of an electrostatic image. The exposed areas are then contacted with an electrostatically charged marking powder or dispersion which clings to the charged areas but does not adhere to the uncharged, i.e. exposed, areas. The visible image which is thus formed may then be transferred to another surface resulting in a positive or negative print, or, if desired, it may be fused in order to fix the image directly to the solid substrate itself.

It is thus evident that the proper selection of a photoconductive system is essential for a successful electrophotographic operation. Among the properties that must be exhibited by such photoconductive materials are included: the ability to accept an electrostatic charge; the ability to hold the charge for a period of time in the absence of light without exhibiting a rapid rate of charge decay; the ability to provide the fixed or developed sheets with excellent print density; the ability to provide an efficient dispersing medium for the pigment particles; inertness of the binder toward the pigment which is being utilized; and, the ability to be readily coated on a solid substrate.

In copending application Ser. No. 704,569, filed on Feb. 12, 1968 and assigned to the assignee of the subject application, photoconductive systems were disclosed which comprised the combination of a zinc oxide pigment and a vinyl acetate-mono-substituted maleate copolymer binder. Although these systems exhibit significantly improved performance characteristics as contrasted with the prior art photoconductive systems, e.g. systems utilizing polyvinyl acetate-based binders, they do not, however, exhibit the aforementioned properties to an optimum level.

It is, thus, the object of this invention to provide a photoconductive system which has the ability to accept and retain an electrostatic charge for a period of time which is sufficient to permit visible development and fixation of an electrostatically formed image and which is, therefore, readily applicable for use in electrophotographic operations. It is a further object to prepare base plates for use in electrophotographic operations by coating the latter photoconductive systems onto applicable solid substrates. Various other objects and advantages of this invention will be apparent from the following description thereof.

I have now found that all of the previously described requirements for an effective photoconductive system are realized by utilizing a photoconductive system which comprises a photoconductive zinc oxide pigment bonded with a blend of a vinyl acetate polymer and a styrene-maleic anhydride copolymer. Particularly significant is the fact that the latter systems exhibit outstanding synergistic properties as compared with the performances exhibited by the individual systems wherein zinc oxide is combined with either a vinyl acetate polymer binder or a styrene-maleic anhydride copolymer binder.

Thus, the photoconductive systems of this invention exhibit exceptional high charge acceptance and low dark decay rate properties. Solid substrates which have been coated with the latter materials will accept and hold an electrostatic charge in the absence of light and, upon being exposed to a light image, will release the charge from the exposed areas but will retain the charge on the unexposed areas for a period of time sufficient to permit visible development of the electrostatic image formed by the unexposed areas. Furthermore, these photoconductive systems are readily coated onto a variety of solid substrates. They also provide the resulting printing sheet with excellent density, i.e. with excellent definition of the visible image.

The polymeric material which is utilized in conjunction with the zinc oxide pigment serves to bind the photoconductive zinc oxide particles and thereby places them in a relationship with one another such that the particles are rendered conductive in the areas where the light radiation strikes the coating. As noted earlier, the novel binders of this invention comprise blends of vinyl acetate homo- or copolymers with styrene-maleic anhydride copolymers.

Regarding the polymers of vinyl acetate which may be used in the binder systems of this invention, these may include polyvinyl acetate or copolymers of vinyl acetate with any polymerizable monomer such, for example, as copolymers containing vinyl acetate in combination with: (1) substituted or unsubstituted mono- and dialkyl esters of alpha, beta-unsaturated dicarboxylic acids such, for example, as mono-ethyl maleate, mono-butyl maleate, mono-cyanoethyl maleate, mono-chlormethyl maleate, diethyl maleate, dioctyl maleate and dinonyl maleate as well as the corresponding fumarates, itaconates and citraconates; (2) substituted or unsubstituted mono- and diaryl esters of alpha, beta-unsaturated dicarboxylic acids such, for example, as mono-benzyl maleate and the corresponding fumarates, itaconates and citraconates; (3) substituted or unsubstituted mono- and dialicyclic esters of alpha, beta-unsaturated dicarboxylic acids such, for example, as mono-cyclohexyl maleate and mono-tetrahydrofurfuryl maleate as well as the corresponding fumarates, itaconates and citraconates; (4) substituted and unsubstituted alkyl esters of acrylic and methacrylic acids such, for example, as ethyl acrylate, butyl methacrylate, 2-ethyl hexyl acrylate and cyanoethyl acrylate; (5) vinyl esters wherein the acid derived radical thereof contains from 2 to 17 carbon atoms such, for example, as vinyl stearate; (6) vinyl esters of alpha-branched saturated aliphatic monocarboxylic acids such, for example, as vinyl pivalate; (7) alpha, beta-unsaturated carboxylic acids such, for example, as acrylic, methacrylic, maleic, fumaric, crotonic, itaconic and citraconic acids; and (8) anhydrides of alpha, beta-unsaturated dicarboxylic acids such, for example, as maleic anhydride, itaconic anhydride and citraconic anhydride.

In addition to copolymers of vinyl acetate with one of the above described comonomers, it is also possible to use polymers of vinyl acetate wherein the vinyl acetate is polymerized with any two or more; of these comonomers. It is preferred, however, that the total comonomer concentration should not exceed about 90 percent, by weight, of the resulting copolymer. Thus, the ratio of vinyl acetate to comonomer should range from about 10:90 to 100:0, by weight.

It should be noted that the latter copolymeric materials may be prepared by means of free radical initiated polymerization techniques well known to those skilled in the polymer art. Thus, they may be directly prepared in the form of organic solvent solutions, i.e. lacquers; in aqueous emulsion form; in aqueous solution form; or, as solid pearls or beadlets which result from a suspension polymerization process. However, the preparation of these copolymers in the form of organic solvent solutions is preferred since, as will be described hereinbelow, they will ordinarily be utilized in the latter form for the actual preparation of the photoconductive systems of this invention.

The styrene-maleic anhydride copolymers which are present in my novel binder systems are also well known to those skilled in the art. These anhydride containing vinyl polymers are ordinarily commercially available or, if desired, they can be readily prepared by any of the free radical initiated polymerization techniques well known to those skilled in the polymer art, and preferably by means of a solution polymerization technique. The copolymers which are applicable for use in my binder systems should contain a mole ratio of styrene moieties to maleic anhydride moieties ranging from about 5:1 to 1:1, and preferably a mole ratio of 3:1.

It should be noted that styrene-maleic anhydride copolymers which contain chain terminating radicals are also applicable for use in the novel binder systems of this invention. Among the solvents which may be utilized in the styrene-maleic anhydride polymerization reaction and which provide such chain terminating radicals are included: alkyl substituted benzenes such, for example, as ethyl benzene, cumene, diisopropyl benzene, triisopropyl benzene, and the ortho-, meta- and para-cymenes; alkoxy substituted benzenes such, for example, as 4methoxy-1-isopropyl benzene and 4-butoxy-1-isopropyl benzene; nonaromatic cyclic solvents such, for example, as para-menthane and para-menthane; aromatic substituted solvents such, for example, as diphenyl methane and diphenyl ethane; halogen-containing solvents such, for example, as mono-chloro cymene, mono-fluoro cymene and mono-bromo cymene; and, nitro-containing solvents such, for example, as 4-isopropyl-1-methyl-2-nitrobenzene; etc. Thus, in general, these solvents contain six-membered carbocyclic rings and are capable of dissolving, under the conditions of the reaction, the styrene and maleic anhydride monomer components but are incapable of dissolving the styrene-maleic anhydride copolymer. Moreover, the organic solvent should be free of unsaturation so as to avoid copolymerization with the styrene or maleic anhydride monomers and the cyclic hydrocarbon nucleus should be free of substituents which may react with the styrene or maleic anhydride monomers under the conditions of the polymerization reaction.

The actual preparation of the novel photoconductive systems of this invention may be accomplished merely by admixing and dispersing the zinc oxide pigment either with the individual organic solvent solutions of the vinyl acetate polymer and the styrene-maleic anhydride copolymer or with a premixed blend of the latter polymer solutions. In either instance, the total solids concentration of the respective polymers in the binder system, i.e. the vinyl acetate and the styrene-maleic anhydride polymer, may range from about 1 – 99 percent to 99 – 1 percent, by weight. It is thus seen that minimal amounts of styrene-maleic anhydride copolymer are sufficient to markedly upgrade the performance of the vinyl acetate polymer binders. The examples given exemplify the synergistic effect obtained with a ratio of vinyl acetate polymer solids to styrene-maleic anhydride copolymer solids from 1:1 to 4:1.

Thereafter, the resulting pigment-binder blend is finely ground to a particle size of from about 4 to 6 on the Hegman scale. Additional solvent may be added, prior to grinding, in order to attain the desired solids content.

Organic solvents such as toluene, xylene, ethyl acetate and methyl ethyl ketone are ordinarily utilized in preparing these photoconductive systems. It should be noted, however, that water can be used as the vehicle or solvent in those instances where it is desired to prepare the final composition in emulsion form or where a water soluble binder is being used, e.g. wherein the vinyl acetate polymer component is derived solely from vinyl acetate and a mono-alkyl maleate ester. The preparation is generally completed by incorporating a sensitizer dye or dye mixture into the blend in a concentration ranging from about 0.02 to 0.05 percent, based on the weight of zinc oxide; the latter sensitizers including, for example, Fluorescein, Rose Bengal and methylene blue. The addition of the latter sensitizers may, however, be obviated if the resulting photoconductive systems are to be utilized in a procedure whereby the light or energy source is itself capable of causing a conductive response in the zinc oxide pigment.

With respect to the relative concentration of the pigment and binder solids, ratios ranging from about 2:1 to 12:1 of pigment solids to binder solids are applicable for use in the novel systems of this invention.

Optional additives may be incorporated into these novel photoconductive systems in order to modify certain properties thereof. Among such additives are included: plasticizers such as dialkyl phthalates; brighteners such as titanium dioxide; silicones; and, other modifying resins such as alkyd resins, etc.

My novel systems may be coated onto a wide variety of solid substrates such, for example, as paper, paperboard, fabrics made from natural and synthetic fibers, metallic coated paper, metallic foils, and synthetic resin-based films such as polyethylene terephthalate, polyethylene, polypropylene, polyvinyl chloride and cellulose acetate, the latter resin-based films having been rendered conductive or semiconductive. The actual application of these photoconductive systems to the selected substrate may be accomplished by the use of any technique which is capable of depositing a continuous film on the surface thereof. Thus, among the various methods of application which may be utilized, one may list wire wound and grooved rod applicators, as well as air knife, trailing blade, gravure, reverse and direct roll coaters. Typical coating weights may range from about 8 to 30 pounds per 3000 square feet of substrate.

Following their application, the photoconductive systems are dried by any convenient means as, for example, by the use of forced air oven drying, infrared or radiant heat drying. Here again, such drying methods are well known and the practitioner may employ the drying means best suited to his particular needs in light of the equipment which is available.

In order to demonstrate the excellent photoconductive properties exhibited by the systems of this invention, the tests described hereinbelow may be used. In each instance, the tests were conducted in an environment wherein the relative humidity was at a level of 55 percent.

Charge Acceptance — The selected photoconductive system is coated onto a paper substrate in a coating weight of 18 pounds per 3000 square feet of paper and then dried. Thereafter, the coated paper is conditioned, in the absence of light, for a period of 24 hours whereupon it is exposed, while still in the dark, to an electrostatic charging unit for a period of 7 seconds. The surface charge which is thus imparted to the coated paper is then measured by means of an electrostatic probe.

Dark Decay Rate — Continuing the procedure of the "Charge Acceptance" test, immediately after removing the charging unit and measuring the deposited surface charge, the electrostatic probe is utilized to measure the rate at which the charge dissipates from the surface of the coated paper. Needless to say, photoconductive systems which, in the absence of light, exhibit a slow charge decay rate are preferred for use in elecrophotographic operations.

The following examples will more fully illustrate the embodiment of this invention. In these examples all parts given are by weight unless otherwise noted.

EXAMPLE I

This example illustrates the preparation of a typical photoconductive system of this invention as well as the excellent properties resulting from the use thereof.

Thus, 40 parts of photoconductive zinc oxide, 50 parts of toluene, 7.5 parts of a 50 percent, by weight, toluene solution of polyvinyl acetate, and 2:5 parts of a 50 percent, by weight, isopropyl acetate solution of a 3:1 styrene:maleic anhydride copolymer were admixed and subjected to grinding in a porcelain ball mill for a period of 4 hours; the latter being the time required to obtain a reasonably fine grind, i.e. 4 to 6 units on the Hegman scale. Thereafter, 0.8 cubic centimeters of a sensitizer mix containing equal parts of Rose Bengal, Fluorescein and methylene blue were intimately dispersed in the mix.

The resulting photoconductive system, which had a total solids content of 45 percent, by weight, was then subjected to the "Charge Acceptance" and "Dark Decay Rate" tests wherein it exhibited a 350 volt charge acceptance and a 4 volt/second dark decay rate. The resulting data clearly indicates that the photoconductive system, whose preparation was described hereinabove, had the capability of accepting a substantial surface charge and of retaining the thus accepted charge for a period of time sufficient to develop and fix an image created thereon.

Furthermore, it is to be noted that upon using the above described photoconductive system in an actual electrophotographic operation, a clear, well-defined image was formed on the coated paper substrate.

EXAMPLE II

This example illustrates the preparation of additional photoconductive systems of this invention and the excellent properties resulting from the use thereof. It further illustrates the improvement noted in these systems as a result of the presence of a styrene-maleic anhydride copolymer in the binder system.

The photoconductive formulations described in the following table were prepared by means of the procedure set forth in example I, hereinabove.

| Ingredients | Parts—Formulation Number | | | | | | | | |
|---|---|---|---|---|---|---|---|---|---|
| | 1 | 2 | 3 | 4 | 5 | 6 | 7 | 8 | 9 |
| A 50%, by weight, toluene solution of a 96.1:2.9 vinyl acetate: monocyanoethyl maleate copolymer | 13.0 | 6.5 | | | | | | | |
| A 50%, by weight, methyl ethyl ketone solution of a 79:15:6 vinyl acetate: dibutyl maleate: monoethyl maleate terpolymer | | | 10.0 | 8.0 | | | | | |
| A 50%, by weight, toluene solution of polyvinyl acetate | | | | | 10.0 | 7.5 | | | |
| A 50%, by weight, 3:1 toluene: ethyl acetate solution of a 52:48 vinyl acetate: octyl acrylate copolymer | | | | | | | 18.0 | 12.6 | |
| A 50%, by weight, isopropyl acetate solution of a 3:1 styrene: maleic anhydride copolymer | | 6.5 | | 2.0 | | 2.5 | | | 10.0 |
| A 50%, by weight, isopropyl acetate solution of a 1:1 styrene: maleic anhydride copolymer | | | | | | | | 5.4 | |
| Zinc oxide | 38.6 | 38.6 | 40.0 | 40.0 | 40.0 | 40.0 | 36.0 | 36.0 | 40.0 |
| Toluene | 51.6 | 51.6 | 50.0 | 50.0 | 50.0 | 50.0 | 46.0 | 46.0 | 50.0 |
| A sensitizer mix containing¹ equal parts of Rose Bengal, Flourescien and methylene blue | 0.8 | 0.8 | 0.8 | 0.8 | 0.8 | 0.8 | 0.8 | 0.8 | 0.8 |
| Total solids content of system (percent by weight) | 45.1 | 45.1 | 45.0 | 45.0 | 45.0 | 45.0 | 45.0 | 45.0 | 45.0 |

¹ Concentration in cubic centimeters.

Upon subjecting the resulting products to the "Charge Acceptance" and "Dark Decay Rate" tests described hereinabove, the following results were obtained:

| Formulation No. | Charge Acceptance (volts) | Dark Decay Rate (volts/sec.) |
|---|---|---|
| 1 | 360 | 3 |
| 2 | 430 | 4 |
| 3 | 350 | 5 |
| 4 | 410 | 5 |
| 5 | 280 | 4 |
| 6 | 350 | 4 |
| 7 | 200 | 3 |
| 8 | 300 | 3 |
| 9 | 280 | 3 |

The results summarized above clearly indicate the excellent photoconductive properties exhibited by the novel systems of this invention. They further indicate the significant improvements obtained as a result of the presence of styrene-maleic anhydride copolymers in the binder system.

Summarizing, it is thus seen that this invention provides a novel class of improved photoconductive systems which are especially suited for use in electrophotographic operations.

Variations may be made in proportions, procedures and materials without departing from the scope of this invention which is defined by the following claims.

I claim:

1. A photoconductive coating system which comprises a blend of: 1. a finely divided photoconductive zinc oxide pigment; and, 2. a binder therefor comprising a solution of a blend of a vinyl acetate polymer and a styrene-maleic anhydride copolymer containing a mole ratio of styrene moieties to maleic anhydride moieties ranging from about 5:1 to 1:1; the ratio of vinyl acetate polymer solids to styrene-maleic anydride copolymer solids in said binder ranging from about 1:1 to 4:1 by weight; wherein said vinyl acetate polymer is a vinyl acetate homopolymer or copolymer of vinyl acetate with at least one polymerizable monomer selected from the group consisting of substituted and unsubstituted mono-alkyl esters of maleic acid, and, substituted and unsubstituted alkyl esters of acrylic acid; and, said zinc oxide pigment being dispersed in said binder solution.

2. The coating composition of claim 1, wherein the ratio of pigment solids to binder solids ranges from about 2:1 to 12:1, by weight.

3. The coating composition of claim 1 in which there is also present from about 0.02 to 0.05 percent of at least one sensitizer dye, as based on the weight of zinc oxide pigment therein.

4. An assembly suitable for use in electrophotographic operations, said assembly comprising a solid substrate coated on at least one surface thereof with a photoconductive coating comprising a finely divided photoconductive zinc oxide pigment which is bound to said substrate by means of an interspersed dried residue of a solution of a blend of a vinyl acetate polymer and a styrene-maleic anhydride copolymer containing a mole ratio of styrene moieties to maleic anhydride moieties ranging from about 5:1 to 1:1; the ratio of vinyl acetate polymer solids to styrene-maleic anhydride copolymer solids in said binder ranging from about 1:1 to 4:1, by weight; wherein said vinyl acetate polymer is a vinyl acetate homopolymer or copolymer of vinyl acetate with at least one polymerizable monomer selected from the group consisting of substituted and unsubstituted mono-alkyl esters of maleic acid.

5. The assembly of claim 4, wherein the ratio of pigment solids to binder solids ranges from about 2:1 to 12:1, by weight.

6. The assembly of claim 4, wherein said photoconductive coating also contains dispersed therein from about 0.02 to 0.05 percent of at least one sensitizer dye, as based on the weight of zinc oxide pigment.

7. A method for producing an electrostatic image which comprises the steps of: (1) electrostatically charging, in the absence of light, a solid substrate coated on at least one surface thereof with a photoconductive coating comprising a finely divided photoconductive zinc oxide pigment which is bound to said substrate by means of an interspersed dried residue of a solution of a blend of: (a) a vinyl acetate polymer selected from the group consisting of polyvinyl acetate and copolymers of vinyl acetate with at least one polymerizable monomer selected from the group consisting of substituted and unsubstituted mono-alkyl esters of maleic acid, and, substituted and unsubstituted alkyl esters of acrylic acid; and (b) a styrene-maleic anhydride copolymer containing a mole ratio of styrene moieties to maleic anhydride moieties ranging from about 5:1 to 1:1; the ratio of vinyl acetate polymer solids to styrene-maleic anhydride copolymer solids in said binder ranging from about 1:1 to 4:1, by weight; (2) exposing the resulting charged surface to a light image thereby discharging the surface at the points of exposure and retaining the unexposed, charged areas in the form of an electrostatic image; and, (3) visibly developing the resulting electrostatic image.

* * * * *